United States Patent [19]

Reiner

[11] 3,748,553

[45] July 24, 1973

[54] SELF-TUNED VIBRATORY FEEDER
[75] Inventor: Robert Leopold Reiner, Bethany, Conn.
[73] Assignee: Cleveland Machine Controls, Inc., Cleveland, Ohio
[22] Filed: Oct. 8, 1971
[21] Appl. No.: 187,621

[52] U.S. Cl..................... 318/128, 310/27, 198/220
[51] Int. Cl. .......................................... H02k 33/02
[58] Field of Search.............. 198/220 DC; 318/127, 318/128, 129, 132, 118; 310/27, 25

[56] References Cited
UNITED STATES PATENTS

| 2,844,777 | 7/1958 | Ross | 318/128 |
| 3,505,544 | 4/1970 | Helms | 310/13 |
| 2,287,223 | 6/1942 | Baird | 318/128 |
| 2,297,084 | 9/1942 | Swallow | 310/27 X |
| 2,287,880 | 6/1942 | Hittson | 318/128 |
| 2,935,671 | 5/1960 | Ross | 318/128 |
| 3,654,540 | 4/1972 | Honig et al. | 318/118 |

Primary Examiner—D. F. Duggan
Attorney—Robert B. Sundheim

[57] ABSTRACT

A driver for a vibratory feeder employs a D.C. field structure with an annular air gap in which is disposed concentrically both a stationary coil and a moving coil. The latter coil is mechanically coupled to drive the flexure supported tray. Both coils are connected in series opposition and have substantially zero resultant inductance. The coils, in series, are connected to both the output and input of an amplifier having a single-ended output to provide a self-excited oscillatory loop. A servo amplifier responding to the flyback voltage generated by the moving coil controls the gain of the main amplifier so as to provide for automatic velocity control. An A.C. shunt is selectably applicable to the main amplifier to suppress oscillation while the amplifier is maintained conductive for dynamic braking when a stop command is executed. The oscillatory wave shape is controlled to avoid high frequency components which give rise to acoustic noise.

19 Claims, 3 Drawing Figures

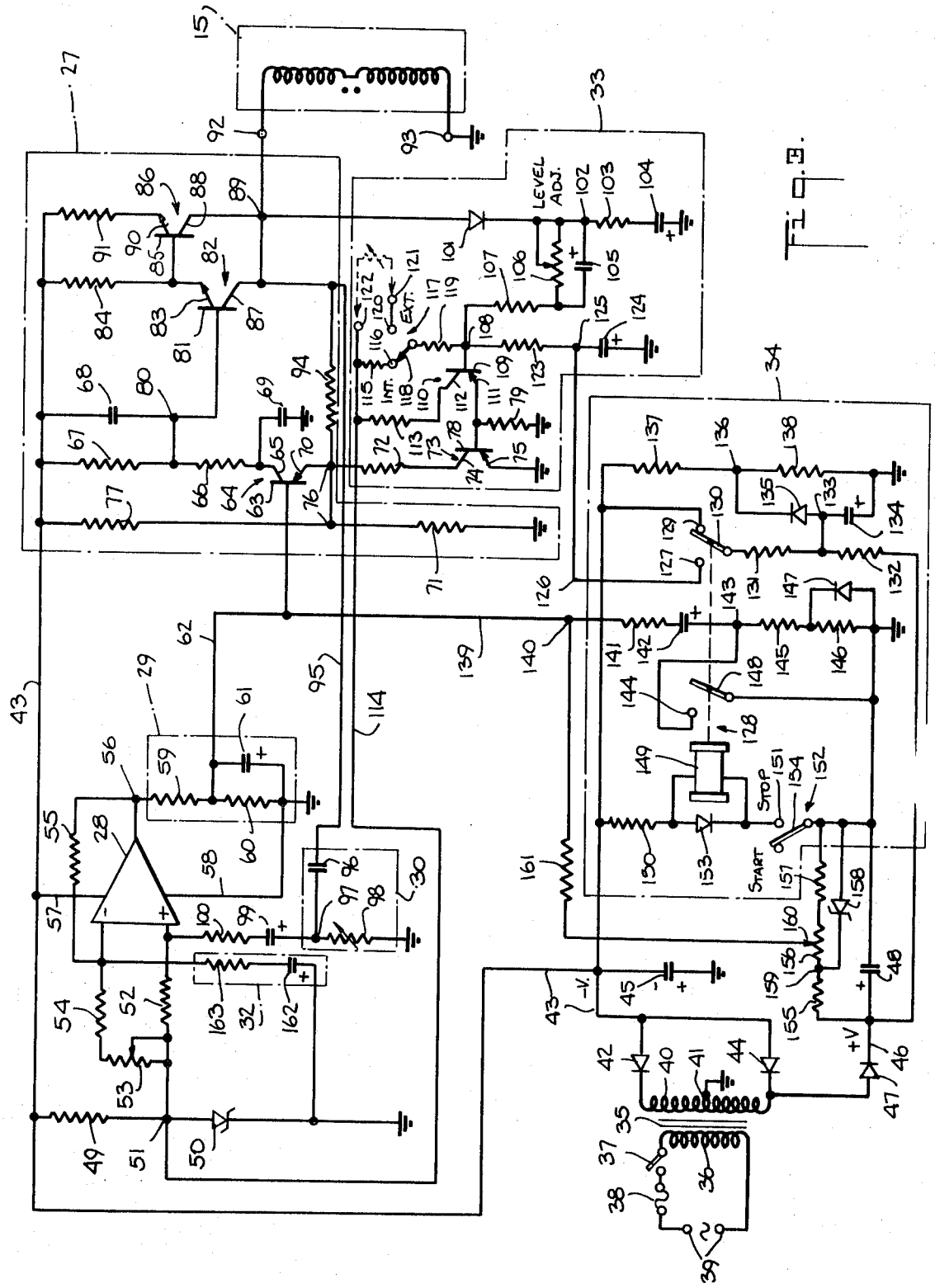

SELF-TUNED VIBRATORY FEEDER

The present invention relates to a system for driving a resonant spring mass system and, more particularly, to a system for driving a vibratory feeder.

Vibratory feeders are employed for controlled movement or feed of bulk material from point-to-point. Such feeders are useful wherever small parts or particulate material is to be transferred from a supply zone to a utilization point. A typical use for a feeder of this type is in conjunction with packaging machinery and the like.

One form of vibratory feeder commercially available prior to the present invention employs an electromagnetic driver having a stationary laminated iron core excited by a field coil for vibrating through magnetic attraction a leaf spring mounted armature mass. The main component of the spring mounted mass is the feed tray or trough over which the material is fed. The frequency at which the structure is vibrated depends upon the frequency of the alternating current powering the electromagnet. Generally, this is 60 hertz.

The known type of feeder is significantly load sensitive in that as material is added to the tray the resonant frequency of the spring mass structure changes. The nature of the drive is such that as the resonant frequency changes the amplitude of vibration also changes. The amplitude is a maximum only when the mechanical resonant frequency of the moving structure is equal to the frequency of the power source. Since the mechanical resonant frequency is affected by the load added to the tray or trough, the feeder described above is normally tuned to have a no-load mechanical resonant frequency somewhat above the frequency of the power source. As load is added the mechanical resonant frequency will drop towards the source frequency. Unfortunately, this mode of operation sacrifices efficiency and such devices are readily overloaded and caused to stall. In order to minimize the sensitivity to varying load, the feed troughs are made relative heavy with an attendant consumption of waste power.

With the foregoing in mind, it is an object of the present invention to provide a system for driving a resonant spring mass system and thereby provide a vibratory feeder which is inherently more flexible in its operation than feeders heretofore known.

A further object of the present invention is to provide a driver for a resonant spring mass system of novel construction.

A still further object of the present invention is to provide a vibratory feeder capable of operation with substantially lighter pans or feed trays than feeders heretofore known.

Another object of the present invention is to provide a system for driving a resonant spring mass system which is substantially independent of line voltage and substantially stall-proof.

In accordance with the present invention, there is provided a system for driving a resonant spring mass system which comprises a driver having a driving coil mounted for reciprocation in an air gap of a magnetic field structure. Means are provided for coupling the driving coil to the spring mass system. An amplifier having an input and an output is provided with its input and output both coupled to the driving coil. Thereby, a self-excited oscillatory loop circuit is developed for driving the driver at the mechanical resonant frequency of the combined driver spring mass combination.

The invention will be better understood after reading the following detailed description of a presently preferred embodiment thereof with reference to the appended drawings in which:

FIG. 3 is a detailed electrical schematic diagram of the control circuit for driving the driver element.

Throughout the several figures of the drawings the same reference numerals are used to designate the same or similar parts.

Figure 1:
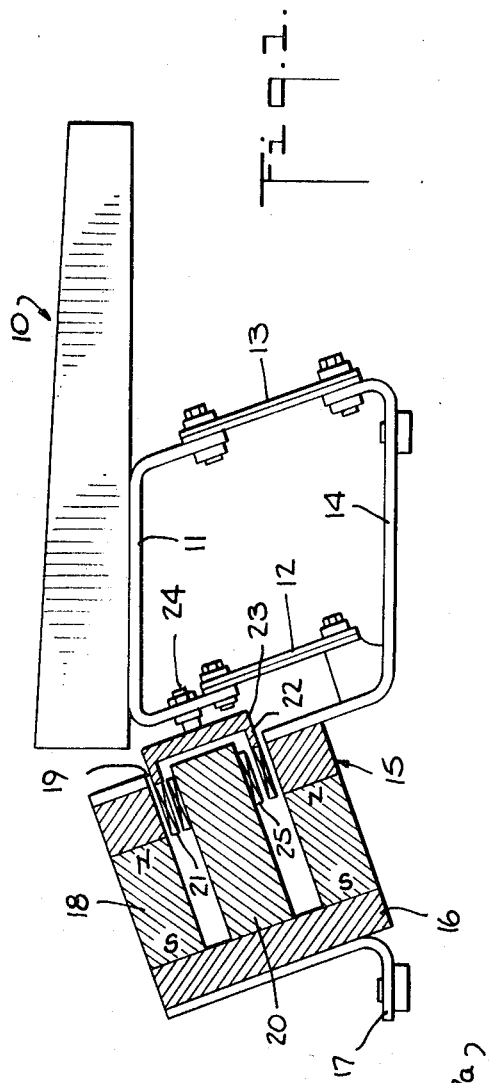
FIG. 1 is a diagrammatic longitudinal sectional view through the driver and coupled vibratory feed tray assembly constructed in accordance with the present invention.

Referring now to FIG. 1, there is designated generally by the reference numeral 10 a typical trough or tray which may have any suitable cross-section, e.g., rectangular, circular or the like. The tray 10 is secured by any suitable means to a bracket or support 11 which is mounted by flexures 12 and 13 on a base member 14. The base member 14 is joined to the field structure of an electro-mechanical driver 15 which has its bottom plate 16 secured to another base member 17. A cylindrical permanent magnet section 18 provides a magnetic field across an annular air gap 19 formed between an outer pole piece and a radially inner core piece 20. A driving coil 21 is mounted in any suitable manner for reciprocation in the air gap 19. The coil 21 is shown suspended at the lower end of the cylindrical skirt portion 22 of a table or armature member 23 which is coupled by the bolt 24 to the bracket 11 for imparting vibratory motion thereto. A stationary compensating coil 25 is disposed in the air gap 19 concentrically related to the driving coil 21. As seen in FIG. 1, the coil 25 is wound directly upon the inner core piece 20. For reasons which will be evident hereinafter, the compensating coil 25 has substantially the same number of turns of substantially the same size conductor at substantially the same pitch as the driving coil 21, such that the inductance of the compensating coil is approximately the same as the inductance of the driving coil.

It is to be understood that the field structure illustrated in the drawings is only exemplary and may be modified in ways well known to those presently skilled in the art. While a permanent magnet type field is shown and preferred, a field which is excited by a D.C. power source may also be employed. Furthermore, the polarization of the field magnet may be reversed from that shown in FIG. 1.

Flexures 12 and 13 may take any well known form and are here shown as composite plate elements having the desired flexural characteristics. The pan or trough 10 may be secured to the bracket 11 by screws or other readily removable means such that the pan 10 may be readily replaced by another of different size or configuration.

Figure 2:
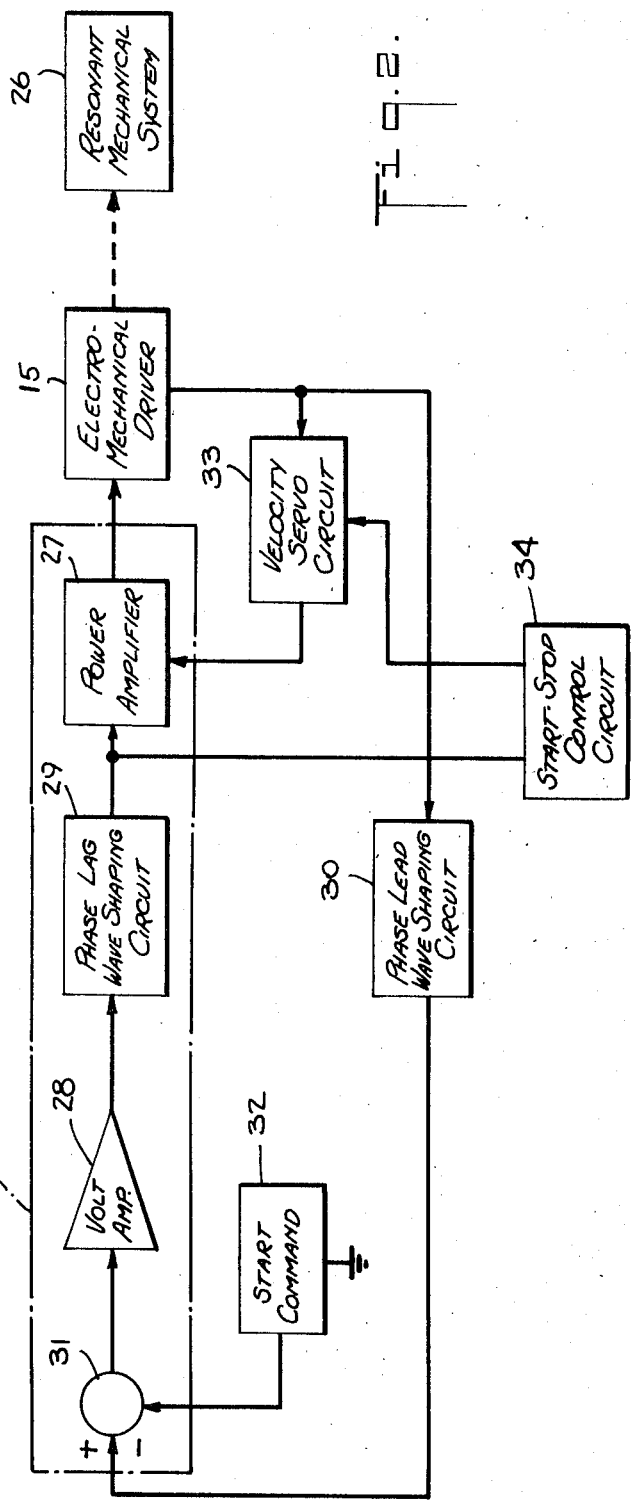
FIG. 2 is a block diagram for the purpose of explaining the basic system circuit for driving the resonant mechanical system.

Referring now to FIG. 2, there is shown in generalized form the electrical system for powering the electro-mechanical driver 15 which drives the resonant mechanical system 26. The system 26 encompasses the trough 10, the support bracket 11, flexures 12 and 13, and the entire moving element of the driver 15, along with any load or contents in the trough 10.

Electric power is supplied to the electro-mechanical driver from a power amplifier 27 which receives its input signal from a high gain voltage amplifier 28 after such signal passes through a phase lag wave shaping circuit 29. A regenerative feedback path is provided from the electro-mechanical driver 15 through a phase lead wave shaping circuit 30 to a summation point 31 which feeds the input of the voltage amplifier 28. Collectively, the components within the broken line box 27a may be considered an amplifier whose output and input are both connected to the driver 15.

A start command circuit 32 also supplies signal to the summation point 31. A further feedback path is provided from the electro-mechanical driver 15 through a velocity servo circuit 33 to the power amplifier 27. Finally, a start-stop control circuit 34 supplies control to both an input of the power amplifier 27 and the velocity servo circuit 33.

The closed loop circuit that can be traced from the output of voltage amplifier 28 through wave shaping circuit 29, power amplifier 27, electro-mechanical driver 15, wave shaping circuit 30, and summation point 31 to the input of amplifier 28 provides for self-excited oscillation. The frequency of oscillation is determined by the mechanical resonant frequency of the combined resonant mechanical system 26 and moving component of driver 15. The velocity servo circuit 33 provides a gain control function regulating the gain of the power amplifier 27 as a function of the velocity of the driver 15 in order to tend to maintain such velocity at a constant level. For a further understanding of the operation of this system, reference should be had to the detailed schematic diagram shown in FIG. 3, to which attention is now directed.

Referring to FIG. 3, to the extent that components can be specifically grouped and identified relative to the block diagram of FIG. 2, such components are designated by the same reference numerals. Thus, the wave shaping circuit 29 is shown within the broken line box 29, while the wave shaping circuit 30 is shown in a similar broken line box 30.

A power transformer 35 has its primary winding 36 connected through a main on-off switch 37 and a fuse or other overload protective device 38 to input terminals 39 for connection to the conventional power mains. In the present embodiment, the power mains may be the usual 120-volt 60 hertz supply. Transformer 35 has a secondary winding 40 with a center tap 41 connected to a point of reference potential here indicated as ground. One end of winding 40 is connected through a unidirectional device or diode 42 to a negative voltage bus or lead 43. The other end of winding 40 is connected through a similar unidirectional device 44 to the same lead 43. A smoothing capacitor 45 is connected between the bus 43 and ground. A positive voltage bus 46 is connected through a third unidirectional device 47 to one end of winding 40, as shown. A smoothing capacitor 48 is connected between the bus 46 and ground.

A voltage divider composed of resistor 49 in series with a zener diode 50 is connected between the negative bus 43 and ground. The junction point 51 between the resistor 49 and the zener diode 50 is connected through a fixed resistor 52 to the positive input of an operational amplifier which performs the function of the voltage amplifier 28. The negative input of the operational amplifier 28 is connected to the junction 51 by an adjustable resistor 53 in series with a fixed resistor 54. A feedback resistor 55 is connected between the output 56 of the operational amplifier 28 and its negative input. Voltage for operating the operational amplifier 28 is supplied thereto from the negative bus over the lead 57 and from ground over the lead 58.

The output 56 of the amplifier 28 is connected to ground through a resistor 59 in series with a resistor 60 which, in turn, is shunted by a capacitor 61. The components 59, 60 and 61 constitute a low pass type of filter constituting the wave shaping circuit 29 for a purpose to be described.

An output of the filter or wave shaping circuit 29 is obtained over the lead 62 which is connected to an input of the power amplifier 27. More specifically, the lead 62 is connected to the base electrode 63 of a P-N-P transistor 64 whose collector electrode 65 is connected through resistors 66 and 67 in series to the negative bus 43. A capacitor 68 shunts the resistor 67 while a capacitor 69 is connected between the collector electrode 65 and ground. The emitter electrode 70 of transistor 64 is connected to ground through a parallel network. One component of the parallel network is the resistor 71. Another component of the parallel network is the resistor 72 in series with the P-N-P transistor 73. As shown, the resistor 72 is connected from the emitter of transistor 64 to the collector electrode 74 of transistor 73 whose emitter electrode 75 is connected to ground. The junction 76 between the emitter 70 and the resistors 71 and 72 is also connected through a resistor 77 to the negative bus 43. Transistor 73 also has a base electrode 78 which is connected to ground through a resistor 79.

The output from transistor 64 is obtained at the junction 80 between the resistors 66 and 67. The junction 80 is connected to the base electrode 81 of an N-P-N transistor 82 which has its emitter electrode 83 connected to the negative bus 43 through a resistor 84 and which is also connected to the base electrode 85 of a further N-P-N transistor 86. The collector electrode 87 of transistor 82 is connected to the collector electrode 88 of transistor 86 at a junction 89. The transistor 86 has an emitter electrode 90 which is connected through a resistor 91 to the negative bus 43. It will be recognized that the transistors 82 and 86 are connected in a conventional Darlington arrangement.

The junction 89 represents the output point of the single-ended output of power amplifier 27 and is connected to a terminal 92. As shown, terminal 92 is connected through the windings 21 and 25 in series opposition to ground via a second terminal 93. The windings 21 and 25 correspond to the driving coil and stationary coil, respectively, shown in FIG. 1. Since the windings are connected in series opposition and have approximately equal inductance they provide an effective resistive load as seen from the terminals 92 and 93.

Junction 89 is also connected through a resistor 94 back to the junction 76 at the emitter 70 of transistor 64. A further connection is provided from junction 89 through lead 95 to an input of the wave shaping circuit 30 and through a capacitor 96 to a junction 97. The junction 97 is connected to ground through an adjustable resistor 98 and is connected through a capacitor 99 in series with a resistor 100 to the positive input of amplifier 28. It will be recognized that the components 96 and 98 constitute a high-pass type filter network. It will also be understood that the wave shaping circuit 29 tends to cause a lag in voltage with respect to the voltage passing therethrough, while the circuit 30 tends to cause a lead in the voltage passing through it. The phase lead introduced by circuit 30 should be substantially equal and opposite to the lag introduced by circuit 29 for any given frequency. Resistor 98 can be adjusted to achieve this relationship.

Junction 89 at the output of the power amplifier is also connected through the unidirectional conducting device or diode 101 to a point 102 which is connected to ground through a series arrangement of a resistor 103 and a capacitor 104. The point 102 is also connected through a parallel arrangement of a capacitor 105 and an adjustable resistor 106 to a resistor 107 which has its opposite end connected at a point 108 to the base electrode 109 of a P-N-P transistor 110. The transistor 110 has its emitter electrode 111 connected to the junction between base electrode 78 of transistor 73 and resistor 79. A collector electrode 112 of the transistor 110 is connected through a resistor 113 to a bus 114 which leads to the junction 51. The bus 114 is connected also through a resistor 115 to a fixed contact 116 of a switch 117. Switch 117 has its moving element or armature 118 connected through a resistor 119 to the point 108. Switch 117 is of the double-throw type having a second fixed contact 120 which is connected to a terminal 121. A second terminal 122 is provided connected to the bus 114. As shown by the phantom lines, a remote external resistor may be connected between the terminals 121 and 122.

Point 108 is connected also through a resistor 123 and a capacitor 124 to ground. The junction 125 between resistor 123 and capacitor 124 is connected over a lead 126 to a fixed contact 127 associated with a relay designated generally by the numeral 128. A second fixed contact of relay 128 is shown at 129 and is connected to the negative bus 43. A relay armature 130 associated with contacts 127 and 129 is connected through resistors 131 and 132 in series to the positive bus 46. The junction 133 between resistors 131 and 132 is connected through a capacitor 134 to ground. The junction 133 is connected also through a unidirectional conducting device or diode element 135 to the junction 136 between resistors 137 and 138 which are connected between the negative bus 43 and ground.

Another connection extends from the lead 62 over lead 139 to a junction point 140. The junction 140 is connected through a resistor 141 in series with a capacitor 142 to a junction 143. Junction 143 is connected to a fixed contact 144 of relay 128 and is also connected to ground through resistors 145 and 146 in series. A unidirectional conducting device 147 is connected in shunt with the resistor 146. An armature 148 of relay 128 associated with the contact 144 is connected, as shown, to ground.

Relay 128 has a winding 149 which is connected at one end through resistor 150 to the negative bus 43 and at its other end to a fixed contact 151 of a switch 152. A unidirectional conducting device 153 is connected in parallel with the winding 149. The armature 154 of switch 152 is connected to ground.

A voltage divider consisting of resistor 155 connected in series with potentiometer 156 and resistor 157 is connected between the positive bus 46 and ground. A zener diode 158 is connected from ground to the junction 159 between resistor 155 and potentiometer 156. The slider 160 on potentiometer 156 is connected through a resistor 161 to the junction 140.

Finally, it will be seen that the start command circuit 32 comprises a capacitor 162 connected in series with a resistor 163 between ground and the negative input of amplifier 28.

The operation of the circuit of FIG. 3 will now be explained. For the sake of discussion, assume that the switch 152 controlling the start-stop function is in the position shown in FIG. 3. When power is turned on to the equipment by closing switch 37, voltage rapidly builds up between the negative and positive buses 43 and 46. Since the switch 152 maintains the circuit through the winding 149 of relay 128 open, the relay contacts 148 and 130 will be in the position shown in the drawings. It should be assumed that all of the capcitors in the circuit are initially discharged. As voltage appears on bus 43, the operational amplifier 28 will become energized. At the same time current will flow through a circuit which can be traced from ground through capacitor 163, resistor 163, resistor 54, resistor 53, junction 51, and resistor 49 to the negative bus 43. This current will flow initially until a blocking charge develops across capacitor 162. Current will likewise flow through a similar circuit traced from ground through resistor 98, capacitor 99, resistor 100, resistor 52, junction 51, and resistor 49 to bus 43. However, resistor 52 is chosen somewhat larger than the maximum total resistance of resistors 53 and 54 in series. This coupled with the fact that resistor 98 provides additional resistance in series with capacitor 99 ensures that the voltage on the negative input of the amplifier 28 will tend to approach closer to ground potential than the potential at the positive input to the amplifier whereby the amplifier will be urged to assume the condition where its output approaches the potential of the negative bus. A potential at point 56 which approaches the negative bus value will tend to render transistor 64 conducting which, in turn, renders transistors 82 and 86 conducting so as to cause current to flow through the windings 21 and 25 from ground. In the absence of the start command network 32 it would be possible for the operational amplifier 28 to assume initially when power is first applied a condition whereby its output approaches ground potential. If this were to occur, it would cause the transistors 64, 82 and 86 to be rendered non-conducting thereby precluding the flow of current through windings 21 and 25. In such case, the circuit would not start. Thus, the capacitor 162 in series with resistor 163 ensures that amplifier 28 assumes a condition at turn-on which causes the transistors in the power amplifier to become conductive.

Upon the commencement of current flow through windings 21 and 25, the moving element of the driver 15 will be displaced against the resistance of the spring flexures. As movement slows upon the moving element approaching the end of its limit of travel, the back e.m.f. developed by winding 21 will decrease causing the voltage at point 89 to move toward the potential at ground. This voltage signal is fed back through lead 95 and wave shaping circuit 30 to the positive input of amplifier 28 causing a reversal in condition of the amplifier 28; that is, the ground potential going signal applied to the positive input will cause the output to shift from that nearest the negative potential towards the potential at ground. This shift in output from amplifier 28 passes through the shaping circuit 29, being delayed somewhat in phase, and causes transistor 64 to become less conductive. This is amplified through transistors 82 and 86 appearing first as a reduction in the supply of current to windings 21 and 25 followed by complete cut-off.

The stored energy in the flexures associated with the resonant mechanical system causes the moving element including driving coil 21 to return towards its original position. A voltage is developed at terminal 92 which is applied to point 89 of the circuit of opposite polarity to that initially applied to the winding. This voltage is of a polarity to cause current to flow through rectifier 101 and through the small phasing resistor 103 into the capacitor 104 which serves as a charge storage element. It should be understood that normally capacitor 104 would have a charge thereon such that its plate furthest removed from ground is negative relative to ground potential. The effect of passing current through diode 101 is to reduce this negative potential or charge on capacitor 104. The extent to which such charge is reduced is proportional to the fly-back velocity of the moving coil 21. Since the mechanical system is free to oscillate, the coil 21 will reverse movement again causing the potential at point 89 to reverse for a second time tending to move in the negative direction. This will, in turn, reverse the condition of amplifier 28 driving its output in the negative direction causing transistors 64, 82 and 86 to turn on again, repeating the cycle. It should now be apparent that the loop circuit will oscillate at a frequency determined by the mechanical resonant frequency of the resonant mechanical system.

The gain of the power amplifier represented by transistors 64, 82 and 86 is determined by the impedance between junction 76 and ground. This impedance is a function of the conductivity of transistor 73. The conductivity of transistor 73 is, in turn, controlled by the conductivity of transistor 110. Together, transistors 73 and 110 constitute an auxiliary amplifier. When power is first turned on current flows through capacitor 124 and resistors 123, 119, and 115 applying a voltage to base electrode 109 of transistor 110 which tends to reduce the conductivity of that transistor. This action tends to reduce the conductivity of transistor 73 which reduces the conductivity of transistor 64 and, therefore, the overall gain of the power amplifier. By initially restricting the gain of the amplifier the system avoids the occurrence of high velocity transients.

After an initial start-up interval, the capacitor 124 will reach maximum charge causing transistor 110 to conduct more heavily and thereby to increase the gain of the power amplifier 27. As oscillation of the driver element 15 builds up, the voltage across capacitor 104 will change in a direction tending to render transistor 110 less conductive and thereby lowering the gain of the power amplifier. It will be seen that this action tends to oppose change in the velocity of the moving element.

It should now be readily apparent that adjusting the resistor 106 can alter the level at which the velocity servo circuit 33 maintains the gain of the power amplifier and, thereby, the velocity of the driver element 15. If the switch 117 is manipulated such that its moving element 118 engages fixed contact 120 any external resistor connected between terminals 121 and 122 will be substituted for the fixed resistor 115. Adjustment of such external resistance will also have the effect of varying the level established by the velocity servo circuit 33.

Adjustable resistor 53 is used to trim the loop phase angle and produce optimum output efficiency and good wave form. The zener diode 50 establishes a stabilized voltage at point 51 for setting the reference point for operation of amplifier 28 as well as for supplying voltage to the transistor 110 in the velocity servo circuit.

The operating point of transistor 64 is adjusted through potentiometer 156. Preferably, this operating point should be established somewhat midway between the potential of the negative bus 43 and ground.

When it is desired to stop operation of the vibratory feeder, the switch 152 is manipulated to the stop position engaging contact 151. This energizes relay winding 149 causing movable contacts 130 and 148 to shift engaging, respectively, fixed contacts 127 and 144. When contact 148 engages fixed contact 144, the junction 143 is connected to ground placing the low impedance A.C. network consisting of capacitor 142 and resistor 141 between the lead 62 and ground. This provides an effective A.C. short for the A.C. signal appearing at the output of amplifier 28 and shunts the input of the power amplifier 27. At the same time, when contact 130 engages fixed contact 127, a charge previously stored on capacitor 134 is transferred to capacitor 124. The polarity of the charge is such as to initially maintain transistor 110 in a conductive condition. This maintains transistors 73, 64, 82 and 86 conductive to provide a low impedance shunt path for current flowing through coils 21 and 25, thereby effecting dynamic braking of the moving element. Current supplied from the positive bus 46 through resistors 132 and 131 ensures that both capacitors 134 and 124 will discharge after a short interval. The interval is long enough, however, to ensure effective dynamic braking of the moving element.

When it is desired to start the vibratory feeder again, the switch 152 is manipulated to the start position interrupting the energization of relay winding 149 causing its contacts 130 and 148 to return to the condition shown in the drawings. When contact 148 leaves contact 144 the A.C. short is removed from across the output of amplifier 28. When contact 130 of relay 128 engages fixed contact 129 a circuit is completed for recharging capacitor 134 in a negative direction. At the same time, the connection to the junction 125 is interrupted such that capacitor 124 is free to charge with point 125 moving in the negative direction. This causes transistor 110 to turn on gradually such that the gain, and thereby, the excitation of winding 21 increases gradually causing smooth commencement of vibration.

The rectifier 147 is included in order that a voltage may be developed across capacitor 142 through rectification of the signal appearing on lead 62 which voltage functions to render transistor 64 more conductive when the stop command is initiated.

It should be understood that if capacitor 134 and its associated interconnections were not provided for transferring a charge to capacitor 124 when the stop command is initiated, the transistor 110 would immediately become non-conductive precluding dynamic braking of the moving element.

The capacitors 68 and 69 are provided for suppressing parasitic oscillation in the power amplifier section. In addition, the capacitor 69 is preferably selected large enough to perform a filtering or smoothing action with respect to the signal being amplified.

In the absence of wave shaping circuits 29 and 30 the circuit would oscillate with abrupt square wave characteristics. It has been discovered that this mode of oscillation is accompanied by excessive acoustic noise emanating from the moving element. It was also discovered that the noise could be reduced appreciably by smoothing the wave shape through the inclusion of the low-pass type filter in the output of amplifier 28. However, this filter introduces a phase lag on the voltage and must be compensated for by the inclusion of a phase lead circuit in the feedback path which circuit appears as shaping circuit 30.

Rectifier 135 functions to block reverse voltage from being applied to capacitors 134 and 124. A positive charge on capacitor 124 would function to delay start-up of the circuit when vibration is desired.

It should be observed that a common coil is employed both to perform the driving function relative to the driver 15 and the feedback function for closing the oscillatory loop circuit. The purpose of the stationary coil 25 is to eliminate the transient effect due to a hysteresis phenomenon. Without the stationary coil it was found that an undesirable low frequency phase shift was introduced adversely affecting operation of the system. By introducing the stationary coil having substantially the same inductance as the moving coil and connected in series opposition as shown in the drawings, the undesirable operation was fully eliminated. Inclusion of the stationary coil resulted in increased amplitude dynamic range and increased ability to maintain constant velocity through the control of the servo circuit.

While FIG. 3 shows the stationary coil located nearest ground, it should be understood that the moving coil may be interchanged therewith. Furthermore, while the stationary coil has been shown in FIG. 1 as located nearest the inner core, it is possible to interchange the two coils with the stationary coil being located on the outer pole face.

Where a lesser dynamic range of control is required, the transistor 110 with its resistors 79 and 113 may be eliminated and replaced by a direct connection between junction 108 and base electrode 78 of transistor 73.

In those cases where it is not important that the device be capable of rapid start and stop function, the start-stop control circuit 34 may be omitted with a simple connection being established from junction 125 to ground through a start-stop switch. Such switch in the start command position should be open circuited while in the stop command condition it should place a short across capacitor 124 to ground.

Typical values of the circuit constants which have been found satisfactory for the circuit of FIG. 3 are set forth in the following tabulation. Unless otherwise indicated, all values of resistances are in ohms and have ½ watt ratings and all values of capacitances are in microfarads. Resistance values followed by an asterisk (*) indicate a potentiometer. $K = \times 10^3$.

RESISTORS

| No. | Value | Ref. No. | Value | Ref. No. | Value |
|---|---|---|---|---|---|
| 49 | 1.5K | 84 | 1K | 132 | 22K |
| 52 | 5.6K | 91 | 0.25/10W. | 137 | 15K |
| 53 | 5K* | 94 | 3.3K | 138 | 470 |
| 54 | 470 | 98 | 2.2K–68K | 141 | 10 |
| 55 | 47K | 100 | 47K | 145 | 10K |
| 59 | 10K | 103 | 4.7 | 146 | 15K |
| 60 | 4.7 K | 106 | 5K* | 150 | 33 |
| 66 | 470 | 107 | 680 | 155 | 1.5K |
| 67 | 2.2K | 113 | 1K | 156 | 5K* |
| 71 | 1K | 115 | 4.7K | 157 | 470 |
| 72 | 47 | 119 | 2.2K | 161 | 10K |
| 77 | 10K | 123 | 220 | 163 | 47K |
| 79 | 4.7K | 131 | 330 | | |

CAPACITORS

| Ref. No. | Value |
|---|---|
| 45 | 14,000 |
| 48 | 100 |
| 61 | 1–35 V.D.C. |
| 68 | 0.1 |
| 69 | 0.47 |
| 96 | 0.22 |
| 99 | 2–50 V.D.C. |
| 104 | 500–6 V.D.C. |
| 105 | 20–30 V.D.C. |
| 124 | 300–15 V.D.C. |
| 134 | 40–50 V.D.C. |
| 142 | 300–15 V.D.C. |
| 162 | 20 |
| 158 | |

DIODES AND TRANSISTORS

| Ref. No. | Type |
|---|---|
| 42 | A15A |
| 44 | A15A |
| 47 | 1N5059 |
| 50 | 1N5241 |
| 64 | 2N4125 |
| 73 | 2N4125 |
| 82 | 2N3054 |
| 86 | 2N3055 |
| 101 | 1N5059 |
| 110 | 2N4125 |
| 135 | MA1703 |
| 147 | MA1703 |
| 153 | MA1703 |
| | 1N5241 |

Relay Coil 149 — 24 volt.
Transformer 35 — ± 25 volt output
Operational Amplifier 28 — µA741C Having described the presently preferred embodiment of the invention it will be understood that various changes in construction can be made without departing from the true spirit of the invention as defined in the appended claims.

What is claimed is:

1. A system for driving a resonant spring mass system comprising a driver having a driving coil mounted for reciprocation in an air gap of a magnetic field structure, and means for coupling said driving coil to said spring mass system; an amplifier having an input and an output; and means coupling said driving coil to both said input and said output of said amplifier to form a self-excited oscillatory loop circuit for driving said driver at the mechanical resonant frequency of the combined driver-spring mass combination, said output of the amplifier is single-ended for supplying current in only one direction to said driving coil during alternate half cycles of the reciprocation thereof, and further means are coupled between said driving coil and said amplifier for responding to the voltage produced across said driving coil during the opposite half cycles of the reciprocation thereof for regulating the gain of said amplifier in a direction tending to maintain said voltage constant.

2. A system according to claim 1, wherein said loop circuit includes means for preventing abrupt voltage changes in the oscillatory voltage present in said output of the amplifier.

3. A system according to claim 2, wherein said means for preventing abrupt voltage changes comprises a first wave shaping circuit in said amplifier and a second wave shaping circuit in the coupling between said driving coil and said input of the amplifier, one of said wave shaping circuits producing a phase lag on voltages passing therethrough and the other of said wave shaping circuits producing a corresponding phase lead on voltages passing therethrough such that the net phase change caused by said first and second wave shaping circuits is substantially zero.

4. A system according to claim 1, wherein said further means comprises an auxiliary amplifier circuit, and means for adjusting the gain of said auxiliary amplifier.

5. A system according to claim 4, wherein said further means comprises a unidirectional conducting device connected in series with a charge storage element across said output of said amplifier, the poling of said unidirectional conducting device being such as to be substantially non-conducting for current in said one direction.

6. A system according to claim 1, wherein control means are provided for starting and stopping oscillation of said oscillatory loop circuit, said control means comprising means for abruptly suppressing the passage of A.C. signals around said loop when it is desired to stop oscillation, and means operative upon initiation of a stop command for temporarily causing operation of said further means in a direction tending to maintain the gain of said amplifier at a maximum level whereby said driving coil is dynamically braked.

7. A system according to claim 5, wherein said driver further includes a stationary compensating coil disposed in said air gap concentrically related to said driving coil and connected in series opposition to said driving coil.

8. A system according to claim 7, wherein said compensating coil has substantially the same number of turns of substantially the same size conductor at substantially the same pitch as said driving coil such that the inductance of said compensating coil is approximately the same as the inductance of said driving coil.

9. A system for driving a resonant spring mass system comprising a driver having a driving coil mounted for reciprocation in an air gap of a magnetic field structure, and means for coupling said driving coil to said spring mass system; an amplifier having an input and an output; and means coupling said driving coil to both said input and said output of said amplifier to form a self-excited oscillatory loop circuit for driving said driver at the mechanical resonant frequency of the combined driver-spring mass combination, control means for starting and stopping oscillation of said oscillatory loop circuit, said control means comprising means for abruptly suppressing the passage of A.C. signals around said loop when it is desired to stop oscillation, and means operative upon initiation of a stop command for temporarily causing operation of said amplifier at maximum gain whereby said driving coil is dynamically braked.

10. A system for driving a resonant spring mass system comprising a driver having a driving coil mounted for reciprocation in an air gap of a magnetic field structure, and means for coupling said driving coil to said spring mass system; an amplifier having an input and an output; and means coupling said driving coil to both said input and said output of said amplifier to form a self-excited oscillatory loop circuit for driving said driver at the mechanical resonant frequency of the combined driver-spring mass combination, control means for starting and stopping oscillation of said oscillatory loop circuit, said control means comprising means for causing said amplifier to operate momentarily at minimum gain upon initiation of a start command to prevent a high velocity transient in the initial motion of said driving coil.

11. A control device for energizing an electro-mechanical driver for driving a resonant spring mass system, said device comprising in combination a high gain voltage amplifier having an input and an output, a power amplifier having an input and a single-ended output, a low pass type filter network interconnecting said output of said voltage amplifier with said input of said power amplifier, said output of said power amplifier having a first output terminal connected to a point of fixed potential and having a second output terminal, a high pass type filter network interconnecting said second output terminal with said input of said voltage amplifier for providing regenerative feedback thereto, said filters being arranged to impose substantially equal and opposite phase shift on the signal voltage passing therethrough, and means selectably operable for selectively preventing oscillation around the loop including said two amplifiers when said output terminals are connected to an electro-mechanical driver.

12. A control device according to claim 11, wherein said means for preventing oscillation comprises a circuit having a low impedance for A.C. signals, and means for selectably connecting said low impedance circuit in shunt with said input of the power amplifier.

13. A control device according to claim 11, further comprising a unidirectional conducting device connected in series with a charge storage element between said two output terminals, the poling of said unidirectional conducting device being such as to be substantially non-conducting for current supplied by said power amplifier, and an auxiliary amplifier having an input coupled across said charge storage element and having an output connected to said power amplifier for regulating the gain of the latter as a function of the charge on said storage device and in a direction tending to maintain said charge constant.

14. A control device according to claim 13, further comprising means operative along with said means for preventing oscillation, upon initiation of a stop command, for temporarily causing operation of said auxiliary amplifier such as to tend to maintain the gain of said power amplifier at a maximum level whereby an effective low impedance shunt appears temporarily across said output terminals.

15. A vibratory feeder comprising in combination a feeder tray; spring means mounting said tray for vibratory feed motion; a driver having a driving coil mounted for reciprocation in an air gap of a magnetic field structure; means coupling said driving coil to said tray for imparting said motion thereto; an amplifier having an input and an output; and means coupling said driving coil to both said input and said output of said amplifier to form a self-excited oscillatory loop circuit for driving said driver at the mechanical resonant frequency of the driver and tray in combination with any load on the tray; said amplifier including means for, when activated, applying unidirectional current to flow in a given direction through said coil; and said coupling means including control circuit means connected to said coil for activating said current applying means in response to a voltage of a first polarity being developed across said coil.

16. A vibratory feeder according to claim 15, wherein said amplifier comprises means for constraining the wave shape of voltage signals passing through the amplifier to that which causes minimum audible noise to be generated by movement of said driver-tray combination.

17. A vibratory feeder comprising:
a feeder tray;
spring means mounting said tray for reciprocal vibratory movement;
a driver including magnetic field producing means for developing a magnetic field across an air gap and a driving coil coupled to said feeder tray and to said spring means for reciprocal vibratory movement therewith in first and second opposing directions in said air gap against respectively opposing forces exerted thereon by at least said spring means so that as said coil moves through said magnetic field a voltage of a first polarity is induced in said coil as it travels through said field in said first direction and a voltage of an opposite second polarity is induced in said coil as it travels through said field in said second direction;

activatable circuit means for, when activated, applying unidirectional current to said coil to flow therethrough in a given direction to develop driving forces imparting movement to said coil in said first direction;

first control circuit means connected to said coil and respectively responsive to a said induced voltage of said first polarity for activating said current applying circuit means and to a said induced voltage of said second polarity for de-activating said current applying means whereby unidirectional current is periodically applied in said given direction to said coil at a frequency essentially corresponding with the mechanical resonant frequency of the driver coil, spring means and tray and any load carried by the tray.

18. A vibratory feeder as set forth in claim 17 wherein said current applying circuit means includes semiconductor means for, when conducting, completing a path for said unidirectional current to flow in said given direction through said coil with the amount of current flowing therethrough varying as a function of the level of conductivity of said semiconductive means.

19. A vibratory feeder as set forth in claim 18 wherein said current applying means includes amplifier means for varying the magnitude of current flowing through said semi-conductor means and said coil, second control circuit means for controlling said amplifier means for varying the magnitude of current flowing through said semiconductor means and said coil in dependence upon the magnitude of a said induced voltage in said coil.

* * * * *